(12) United States Patent
Iwamatsu

(10) Patent No.: US 9,983,911 B2
(45) Date of Patent: May 29, 2018

(54) ANALYSIS CONTROLLER, ANALYSIS CONTROL METHOD AND COMPUTER-READABLE MEDIUM

(71) Applicant: NEC CORPORATION, Tokyo (JP)

(72) Inventor: Yosuke Iwamatsu, Tokyo (JP)

(73) Assignee: NEC CORPORATION, Tokyo (JP)

(*) Notice: Subject to any disclaimer, the term of this patent is extended or adjusted under 35 U.S.C. 154(b) by 216 days.

(21) Appl. No.: 14/829,074

(22) Filed: Aug. 18, 2015

(65) Prior Publication Data

US 2016/0055037 A1    Feb. 25, 2016

(30) Foreign Application Priority Data

Aug. 19, 2014   (JP) .................................. 2014-166676

(51) Int. Cl.
  *G06F 9/46*    (2006.01)
  *G06F 9/50*    (2006.01)

(52) U.S. Cl.
  CPC ............ *G06F 9/5077* (2013.01); *G06F 9/505* (2013.01); *G06F 9/5066* (2013.01)

(58) Field of Classification Search
  CPC ....... G06F 9/5077; G06F 9/505; G06F 9/5066
  See application file for complete search history.

(56) References Cited

U.S. PATENT DOCUMENTS

| | | | | |
|---|---|---|---|---|
| 2006/0039364 A1* | 2/2006 | Wright | ................ | H04L 41/0893 370/352 |
| 2006/0069897 A1* | 3/2006 | Uchino | .................... | G06F 9/50 711/168 |
| 2008/0123593 A1* | 5/2008 | Fujita | .................. | H04W 72/044 370/330 |
| 2010/0251253 A1* | 9/2010 | Pike | ...................... | G06F 9/5083 718/104 |
| 2011/0307901 A1* | 12/2011 | Blanding | .............. | G06F 9/5061 718/104 |
| 2012/0159367 A1* | 6/2012 | Calcaterra | ............. | G06F 9/5011 715/771 |

FOREIGN PATENT DOCUMENTS

| | | |
|---|---|---|
| JP | 200556201 A | 3/2005 |
| JP | 4286703 B2 | 7/2009 |
| JP | 2014115905 A | 6/2014 |

OTHER PUBLICATIONS

International Search Report dated Nov. 24, 2015 from the International Searching Authority in corresponding International Application No. PCT/JP2015/004091.

* cited by examiner

*Primary Examiner* — James J Lee
(74) *Attorney, Agent, or Firm* — Sughrue Mion, PLLC

(57) ABSTRACT

An analysis controller, method and computer readable medium for determining an allocation pattern representing an allocation of at least one analysis unit, among a plurality of analysis units, to one or more processing devices, among a plurality of processing devices, on a basis of an estimated load for each of the at least one analysis unit for each of one or more time spans, allowable delay time for each of the at least one analysis unit, and a processing capacity of each of the plurality of processing devices.

17 Claims, 14 Drawing Sheets

| ANALYSIS UNIT | LARGEST ESTIMATED LOAD IN T SECONDS/T VALUE |
|---|---|
| A1 | 2000-100×ln$T$ |
| A2 | 1800-100×ln$T$ |
| A3 | 4000-400×ln$T$ |

| ANALYSIS UNIT | ALLOWABLE DELAY TIME (SECONDS) |
|---|---|
| A1 | 6 |
| A2 | 6 |
| A3 | 600 |

| PROCESSING DEVICE | PROCESSOR PROCESSING CAPACITY |
|---|---|
| FIRST PROCESSING DEVICE | 4000 |
| SECOND PROCESSING DEVICE | 4000 |

FIG. 9

| ALLOCATION PATTERN | PROCESSING DEVICE | ANALYSIS UNIT | EXCESS CAPACITY SCORE | | SMALLEST VALUE OF EXCESS CAPACITY SCORES | LARGEST VALUE OF SMALLEST VALUES OF EXCESS CAPACITY SCORES (ALLOCATION PATTERN) |
|---|---|---|---|---|---|---|
| | | | 6 SECONDS | 600 SECONDS | | |
| P1 | FIRST | A1, A2, A3 | 558.35 | 38.16 | 38.16 | 1398.46 (P4) |
| | SECOND | NONE | 4000 | 4000 | | |
| P2 | FIRST | A1, A2 | 558.35 | 1479.39 | 558.35 | |
| | SECOND | A3 | 4000 | 2558.77 | | |
| P3 | FIRST | A1, A3 | 2179.18 | 1198.46 | 1198.46 | |
| | SECOND | A2 | 2379.18 | 2839.69 | | |
| P4 | FIRST | A1 | 2179.18 | 2639.69 | 1398.46 | |
| | SECOND | A2, A3 | 2379.18 | 1398.46 | | |

| ANALYSIS UNIT | LARGEST ESTIMATED LOAD IN T SECONDS/T VALUE | VARIATION COEFFICIENT |
|---|---|---|
| A1 | 2000-100 × ln$T$ | 0.5 |
| A2 | 1800-100 × ln$T$ | 0.5 |
| A3 | 4000-400 × ln$T$ | 0.5 |

FIG. 13

| ALLOCATION PATTERN | PROCESSING DEVICE | ANALYSIS UNIT | EXCESS CAPACITY SCORE 6 SECONDS | EXCESS CAPACITY SCORE 600 SECONDS | SMALLEST VALUE OF EXCESS CAPACITY SCORES | LARGEST VALUE OF SMALLEST VALUES OF EXCESS CAPACITY SCORES (ALLOCATION PATTERN) |
|---|---|---|---|---|---|---|
| P1 | FIRST | A1, A2, A3 | 0.677 | 0.513 | 0.513 | 0.951 (P4) |
| | SECOND | NONE | 1 | 1 | | |
| P2 | FIRST | A1, A2 | 0.677 | 0.951 | 0.677 | |
| | SECOND | A3 | 1 | 0.9998 | | |
| P3 | FIRST | A1, A3 | 0.991658 | 0.887 | 0.887 | |
| | SECOND | A2 | 0.998 | 0.9999995 | | |
| P4 | FIRST | A1 | 0.992 | 0.99995 | 0.951 | |
| | SECOND | A2, A3 | 0.998 | 0.951 | | |

| PROCESSING DEVICE | PROCESSOR PROCESSING CAPACITY |
|---|---|
| FIRST PROCESSING DEVICE | 3000 |
| SECOND PROCESSING DEVICE | 3000 |

FIG. 17

| ALLOCATION PATTERN | PROCESSING DEVICE | ANALYSIS UNIT | EXCESS CAPACITY SCORE | | AVERAGE OF EXCESS CAPACITY SCORES FOR RESPECTIVE TIME SPANS | EXCESS CAPACITY SCORES INCLUDE NEGATIVE NUMBER? | LARGEST VALUE OF AVERAGES OF EXCESS CAPACITY SCORES FOR RESPECTIVE TIME SPANS IN ALLOCATION PATTERNS IN WHICH EXCESS CAPACITY SCORES INCLUDE NO NEGATIVE NUMBER (ALLOCATION PATTERN) |
|---|---|---|---|---|---|---|---|
| | | | 6 SECONDS | 600 SECONDS | | | |
| P1 | FIRST | A1, A2, A3 | -441.65 | -961.84 | -701.75 | YES | 1609.43 (P3) |
| | SECOND | NONE | 3000 | 3000 | 3000 | | |
| P2 | FIRST | A1, A2 | -441.65 | 479.39 | 18.87 | YES | |
| | SECOND | A3 | 3000 | 1558.77 | 2279.39 | | |
| P3 | FIRST | A1, A3 | 1179.18 | 198.46 | 688.82 | NO | |
| | SECOND | A2 | 1379.18 | 1839.69 | 1609.43 | | |
| P4 | FIRST | A1 | 1179.18 | 1639.69 | 1409.43 | NO | |
| | SECOND | A2, A3 | 1379.18 | 398.46 | 888.82 | | |

| ANALYSIS UNIT | LARGEST ESTIMATED ANALYSIS TARGET COUNT IN T SECONDS/T |
|---|---|
| A1 | $5 - 0.5 \times \ln T$ |
| A2 | $2 - 0.25 \times \ln T$ |
| A3 | $10 - 1.0 \times \ln T$ |

| ANALYSIS UNIT | ESTIMATED LOAD PER SECOND WHERE THERE ARE N ANALYSIS TARGETS |
|---|---|
| A1 | 1000+200 × N |
| A2 | 1000+400 × N |
| A3 | 400 × N |

ANALYSIS CONTROLLER, ANALYSIS CONTROL METHOD AND COMPUTER-READABLE MEDIUM

CROSS-REFERENCE TO RELATED APPLICATIONS

This application claims priority from Japanese Patent Application No. 2014-166676, filed on Aug. 19, 2014, in the Japanese Patent Office (JPO), the disclosure of which is incorporated herein by reference in its entirety.

BACKGROUND

Technical Field

The present disclosure may generally relate to an analysis controller and an analysis control method that allocate a plurality of analysis units to a plurality of processing devices, and a computer-readable medium for performing the same.

Description of the Related Art

A plurality of analysis units for analyzing data, which is an analysis target, may be allocated to a plurality of processing devices, and a predetermined analysis may be performed in each processing device. An analysis controller may control and determine allocation of the plurality of analysis units to the plurality of processing devices. In some aspects, depending on the content of data to be subjected to analysis processing, loads imposed on the respective analysis unit may vary greatly. Thus, the analysis controller may determine an optimum analysis unit allocation pattern for the plurality of processing devices to prevent the load of the analysis processing from concentrating locally on a particular processing device.

An example of an analysis controller in the related art may divide a service operated by an overloaded computer cluster into a plurality of time slots each having a predetermined time span, and a part of the service may be assumed by the entire computer cluster system. In some aspects, the analysis controller may prevent the respective computer clusters from being overloaded and efficiently uses computational resources of the computer clusters.

In some aspects, the aforementioned technique is based on a premise that a part of a service performed by a certain computer cluster can be performed by another computer cluster as a derivative service. Therefore, the technique described above lacks consideration of an analysis engine that cannot transfer an instance that is being subjected to analysis processing to another processing device. In other aspects, the aforementioned technique may not include control for generating an intentional delay during a service being performed to temporarily reduce load. Therefore, in the technique described above, it may be difficult to determine allocation in consideration of load variation that occurs when a delay is generated.

SUMMARY OF THE DISCLOSURE

Exemplary embodiments of the present disclosure overcome the above disadvantages and other disadvantages not described above. Also, the present exemplary embodiments are not required to overcome the disadvantages described above, and an exemplary embodiment of the present disclosure may not overcome any of the problems described above.

According to an exemplary non-limiting embodiment, there is provided an analysis controller including a memory storing instructions and at least one processor configured to receive the instructions. The processor configured by the instructions to determine an allocation pattern representing an allocation of at least one analysis unit, among a plurality of analysis units, to one or more processing devices, among a plurality of processing devices, on a basis of an estimated load for each of the at least one analysis unit for each of one or more time spans, allowable delay time for each of the at least one analysis unit, and a processing capacity of each of the plurality of processing devices, allocate the at least one analysis unit to the plurality of processing devices on a basis of the allocation pattern, designate delay time and a processing priority for each of the analysis units, and provide an instruction to the plurality of processing devices to perform an analysis.

According to another exemplary embodiment, there is provided an analysis control method performed by at least one processor. The method may include determining, by at least one processor, an allocation pattern representing an allocation of at least one analysis unit, among a plurality of analysis units, to one or more processing devices, among a plurality of processing devices, on a basis of an estimated load for each of the at least one analysis unit for each of one or more time spans, allowable delay time for each of the at least one analysis unit, and a processing capacity of each of the plurality of processing devices, allocating the at least one analysis unit to the plurality of processing devices on a basis of the allocation pattern, designating delay time and a processing priority for each of the analysis units; and providing an instruction to the plurality of processing devices to perform an analysis.

According to yet another exemplary embodiment, there is provided a non-transitory computer-readable storage medium having stored thereon instructions that when executed by a computer enable the computer to implement a method. The method may include determining, by at least one processor, an allocation pattern representing an allocation of at least one analysis unit, among a plurality of analysis units, to one or more processing devices, among a plurality of processing devices, on a basis of an estimated load for each of the at least one analysis unit for each of one or more time spans, allowable delay time for each of the at least one analysis unit, and a processing capacity of each of the plurality of processing devices; allocating the at least one analysis unit to the plurality of processing devices on a basis of the allocation pattern; designating delay time and a processing priority for each of the analysis units; and providing an instruction to the plurality of processing devices to perform an analysis.

BRIEF DESCRIPTION OF THE DRAWINGS

FIG. 9 is a table indicating results of calculation of excess capacity scores related to possible allocation patterns of analysis units to processing devices by the analysis controller according to at least one exemplary embodiment, for each of a plurality of time spans;

FIG. 13 is a table indicating results of calculation of excess capacity scores related to possible allocation patterns of analysis units to processing devices by the analysis controller according to at least one exemplary embodiment, for each of a plurality of time spans;

FIG. 17 is a table indicating results of calculation of excess capacity scores related to possible allocation patterns of analysis units to processing devices by the analysis controller according to at least one exemplary embodiment, for each of a plurality of time spans;

DETAILED DESCRIPTION

In the following detailed description, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawings.

First Exemplary Embodiment

Figure 1:
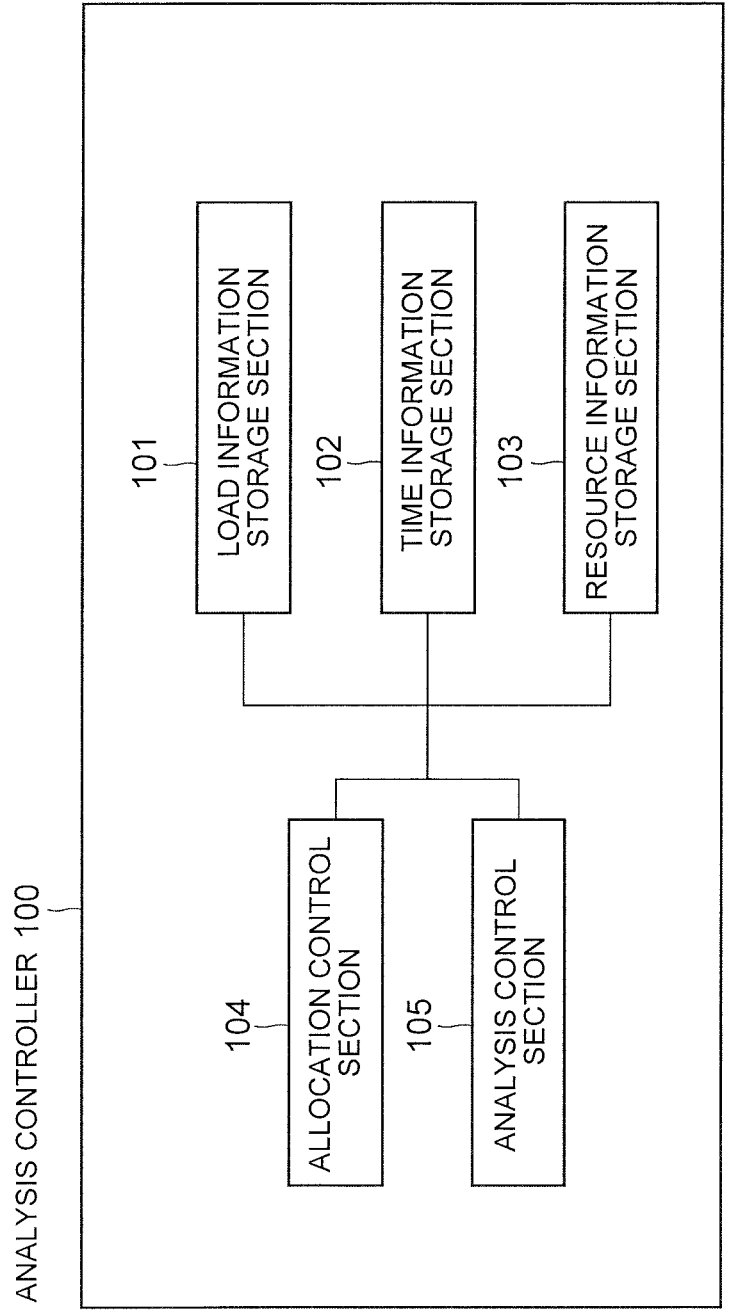
FIG. 1 is a block diagram illustrating a configuration of an analysis controller according to at least one exemplary embodiment.

FIG. 1 is a block diagram illustrating a configuration of an analysis controller according to at least one exemplary embodiment. Referring to FIG. 1, the analysis controller 100 may include a load information storage section 101, a time information storage section 102, a resource information storage section 103, an allocation control section 104 and an analysis control section 105.

In the present exemplary embodiment, for an analysis requiring three analysis units, for example, analysis units A1, A2 and A3, the analysis controller 100 may determine how to allocate the analysis units to a first processing device to which a maximum of three analysis units can be allocated and a second processing device to which a maximum of two analysis units can be allocated. The number of processing devices connected to and controlled by the analysis controller 100, the number of analysis units that can be allocated to each processing device and the number of analysis units required for an analysis may not be limited to the above, and each may be any number. The analysis unit may include a virtual machine on a processing device, a program set executed on the virtual machine and/or a job executed on a processing device.

The configuration of the analysis controller 100 according to the first exemplary embodiment will be described.

The load information storage section 101 may store an estimated load for each of the three analysis units, for each time span.

Figure 2:
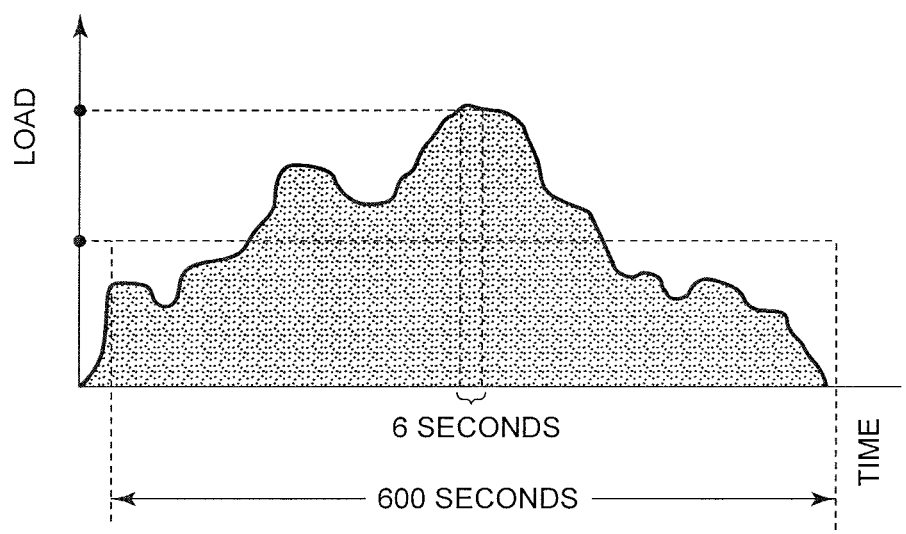
FIG. 2 is a schematic diagram illustrating an example of variation in load of an analysis along a time axis in the analysis controller according to at least one exemplary embodiment.
Figure 3:
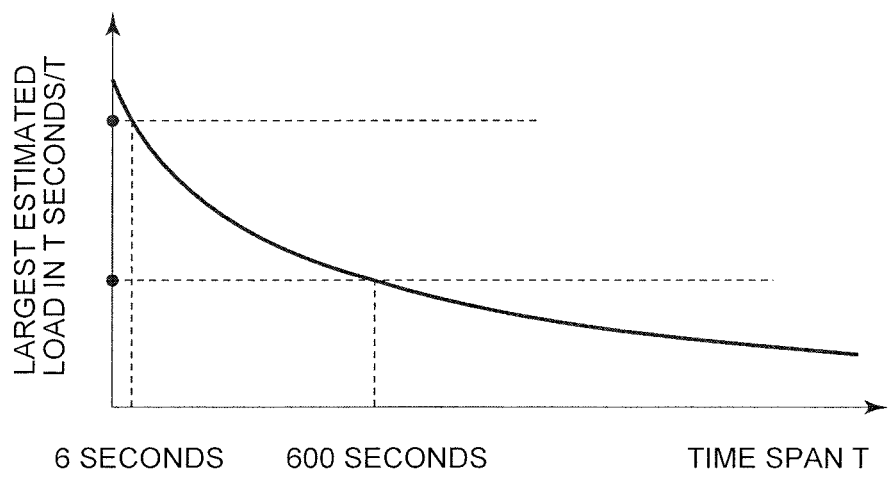
FIG. 3 is a schematic diagram illustrating an example of largest estimated load in T seconds of analysis/T along a time axis in the analysis controller according to at least one exemplary embodiment.

In some aspects, if each of the processing devices performs analysis processing while delaying the analysis processing of the analysis unit A1, A2 and/or A3, as illustrated in FIGS. 2 and 3, the estimated load in each time span may vary. An example of the variation will be described in detail using FIGS. 2 and 3. FIG. 2 is a schematic diagram illustrating variation in load of an analysis along a time axis.

FIG. 2 is a schematic diagram indicating that where the time span is T seconds, a value obtained by dividing a largest estimated load in T seconds by T decreases as T increases. For example, if a data frame for transmitting an analysis processing target from a data distribution apparatus to a processing device is not buffered in the processing device, a largest estimated load may be a load at the time of a peak. The processing device may buffer the data frame, and perform an analysis while delaying the data frame for a time span of a maximum of six seconds. In this case, the processing device may perform the analysis with the load at the time of a peak dispersed to off-peak time other than the peak time. For example, where a time span for delay is a maximum of six seconds, a value obtained by dividing a largest estimated load in six seconds by 6 may be smaller than the load at the time of a peak. In other instances, where an analysis is performed while delaying the data frame for a time span of a maximum of 600 seconds by buffering, off-peak time other than the peak time may increase. Thus, a value obtained by dividing a largest estimated load in 600 seconds by 600 may be smaller than that of the case where the time span is 6 seconds.

In other words, where the time span is T seconds, a value obtained by dividing a largest estimated load in T seconds by T (hereinafter, referred to as "largest estimated load in T seconds/T") may decrease as T increases. In the example in FIG. 3, the analysis controller 100 may generate the model of largest estimated load in T seconds/T logarithmically decreasing as T increases, and store a function of the model.

The value of the largest estimated load in T seconds/T may not be limited to the example illustrated in FIG. 3, and the analysis controller 100 may store the value of the largest estimated load in T seconds/T using other functions and/or another tabular format. In some aspects, coefficients of such functions and/or values in the tabular format may be calculated from values measured as a result of an analysis being performed or may be calculated from, e.g., theoretical values.

The time information storage section 102 may store delay time allowed by a user from receipt of data to be analyzed (analysis processing targets) by each of the processing devices until each analysis unit outputs an analysis result. For example, where a user makes a request of obtaining a result of analysis by the analysis unit A1 within 6 seconds, the time information storage section 102 may store allowable delay time for the analysis unit A1 as six seconds.

Figures 7, 8:
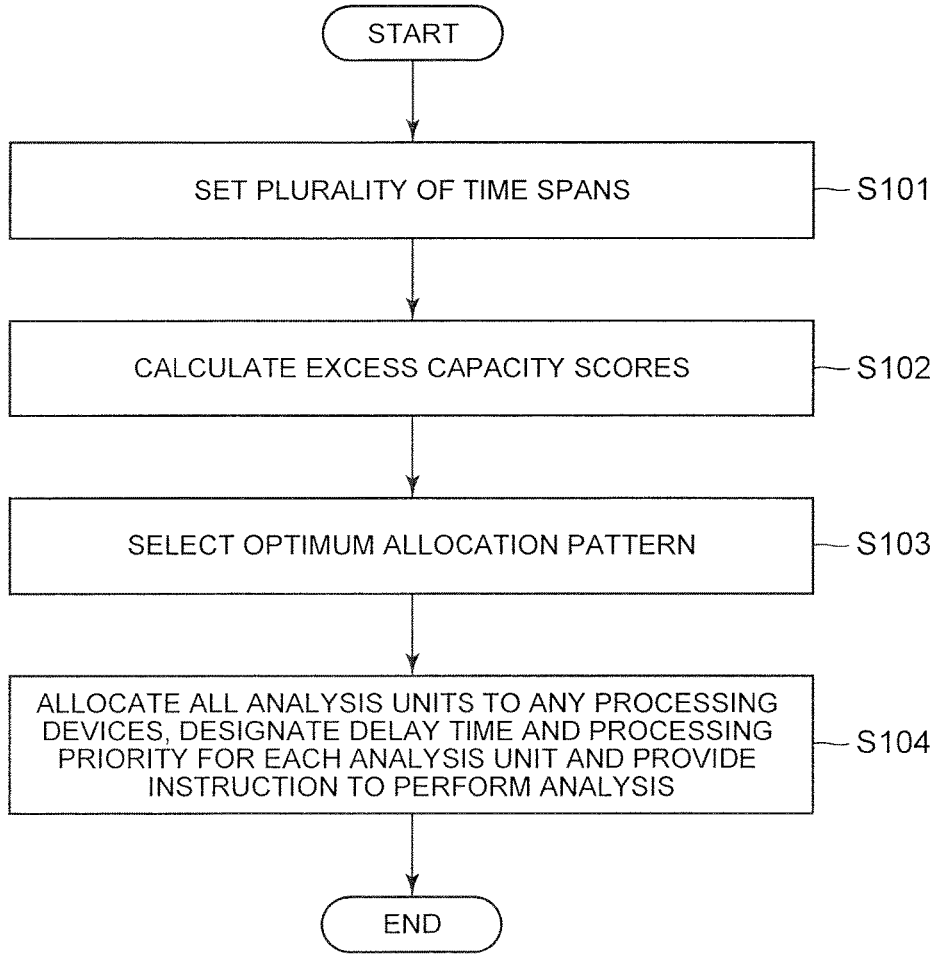
FIG. 7 is a table indicating a value of a processor processing capacity of each processing device, which is information stored in a resource information storage section of the analysis controller according to at least one exemplary embodiment.
FIG. 8 is a flowchart illustrating an outline of operation for allocation of analysis units and performance of an analysis in the analysis controller according to at least one exemplary embodiment.

The resource information storage section 103 may store a processing capacity of each of the first processing device and the second processing device. FIG. 7 is a table indicating an example of processor processing capacities stored in the resource information storage section 103. In FIG. 7, processor processing capacities of the processing devices may be each stored as an amount of time (milliseconds) that can be provided for processing by the entire processing device in a time unit. For example, where the number of processors in a processing device is four, an amount of time that can be provided for processing by the entire processing device in one second is 4000 milliseconds. In other instances, where the processing capacity of a processor in a processing device is one-half of the processing capacity of a reference processor, an amount of time that can be provided for processing by the entire processing device in one second is 500 milliseconds. These values may be values calculated from values measured as a result of processing or may be values calculated from, e.g., theoretical values.

The allocation control section 104 may determine an allocation pattern representing a combination of the plurality of (in the present exemplary embodiment, three) analysis units to be allocated to the plurality of processing devices.

The analysis control section 105 may allocate the three analysis units to the first processing device and the second processing device on a basis of the allocation pattern determined by the allocation control section 104, designate delay time and a processing priority for each of the analysis units, and provide an instruction to perform an analysis. In some aspects, the analysis control section 105 may include a delay time control section and a processing priority control section, and these control sections may manage delay time and processing priorities, respectively.

Figures 4, 5, 6:
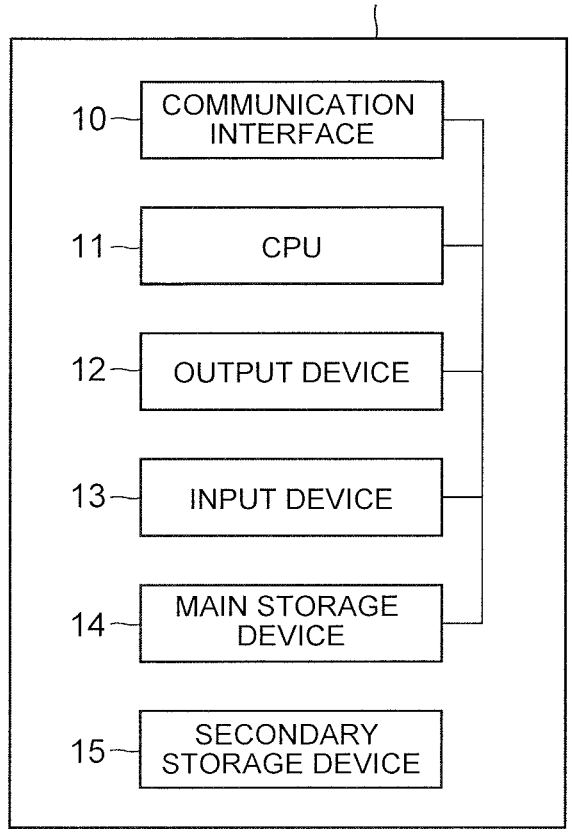
FIG. 4 is a diagram illustrating an example hardware configuration of the analysis controller according to at least one exemplary embodiment.
FIG. 5 is a table indicating a largest estimated load in T seconds/T value for each analysis unit, which is information stored in a load information storage section of the analysis controller according to at least one exemplary embodiment.
FIG. 6 is a table indicating a value of allowable delay time for each analysis unit, which is information stored in a time information storage section of the analysis controller according to at least one exemplary embodiment.

FIG. 4 is a diagram illustrating an example hardware configuration where the analysis controller 100 according to at least one exemplary embodiment is provided by a computer apparatus 1000. As illustrated in FIG. 4, the computer apparatus 1000 may include a communication interface 10, a CPU 11, an output device 12, an input device 13, a main storage device 14 and a secondary storage device 15, respectively.

The communication interface 10 may provide an input/output interface for communication with the processing devices and peripheral terminals. In some aspects, the communication interface 10 may include an interface for control of connection with a network connected to the analysis controller 100.

The CPU 11 may make an operating system operate to control the entire computer apparatus 1000. In some aspects, the CPU 11 may read a program or data from the secondary storage device 15 to the main storage device 14. In other aspects, the CPU 11 of the computer apparatus 1000 may operate as the allocation control section 104 and the analysis control section 105 to perform various kinds of processing on a basis of respective programmed control. In some aspects, the computer apparatus 1000 may not necessarily include only one CPU 11 and may include two or more CPUs 11.

In some aspects, the output device 12 may be provided by a display or an indicator and may be used to check an output.

In some aspects, the input device 13 may be provided by a mouse, a keyboard or embedded key buttons and may be used for an input operation. The input device 13 may not be limited to a mouse, a keyboard or embedded key buttons, and may be, for example, a touch panel.

In some aspects, the main storage device 14 may be a work memory that is based on control by the CPU 11.

In some aspects, the secondary storage device 15 may be an optical disk, a flexible disk, a magneto-optical disk, an external hard disk or a semiconductor memory, and may store a computer program in a computer-readable manner. The secondary storage device 15 may temporarily or permanently store a computer program to be executed by the computer apparatus 1000. Therefore, the CPU 11 may read the computer program recorded in the secondary storage device 15, and may operate as the allocation control section 104 and the analysis control section 105 according to the program.

The computer program may be downloaded from an external computer connected to a communication network. The secondary storage device 15 of the computer apparatus 1000 may function as the load information storage section 101, the time information storage section 102 and the resource information storage section 103.

The block diagram in FIG. 1, which may illustrate the first exemplary embodiment, may be a diagram illustrating blocks of functional units. These functional blocks may not be necessarily provided by the computer apparatus illustrated in FIG. 4 and each of the sections may be provided by a hardware circuit. In some aspects, units included in the analysis controller 100, the units providing the respective sections, may not be specifically limited. In other words, the analysis controller 100 may be provided by one physically unitary apparatus or may be provided by a plurality of apparatuses that are two or more physically separated apparatuses connected via a wire or wirelessly.

Operation of the analysis controller 100 configured as described above will be described with reference to the flowcharts in FIGS. 8 and 11.

FIG. 8 is a flowchart illustrating an outline of operation for allocation of analysis units and performance of an analysis in the analysis controller 100. The processing in the flowchart may be performed on a basis of the aforementioned programmed control by the CPU. In some aspects, it is assumed that the largest estimated load in T seconds/T values stored in the load information storage section 101, the allowable delay time values stored in the time information storage section 102, and the processor processing capacity values stored in the resource information storage section 103 are those indicated in FIGS. 5, 6 and 7, respectively. In other word, each value may be stored in association with information representing an analysis unit or information representing a processing device.

As illustrated in FIG. 8, in step S101, the allocation control section 104 may refer to the time information storage section 102 and may set a plurality of time spans. Referring to FIG. 6, two values that are 6 seconds and 600 seconds may be provided as allowable delay time. The allocation control section 104 may set the plurality of time spans as two types, that is, 6 seconds and 600 seconds. In some aspects, the allocation control section 104 may set the plurality of time spans at values obtained by further segmenting the values stored in the time information storage section 102. For example, the allocation control section 104 may set the plurality of time spans at 6 seconds, 60 seconds, 600 seconds and 6000 seconds.

In step S102, the allocation control section 104 may calculate excess capacity scores related to possible allocation patterns of the analysis units, and to the processing devices, for each of the plurality of time spans set in step S101. FIG. 9 is a diagram illustrating an example of a table of results of calculation of excess capacity scores for allocation patterns P1, P2, P3 and P4.

Excess capacity scores may be values obtained by quantifying estimations of the excess capacities in the processing devices. The allocation control section 104 may calculate each excess capacity score for a time span T as described below. The allocation control section 104 may pick out analysis unit(s) whose allowable delay time is no more than the time span T, from among the analysis unit(s) allocated to a relevant processing device. The allocation control section 104 may calculate an estimated load in the time span T, for each of such analysis unit(s), and may calculate a total estimated load by totaling the estimated loads. A value obtained by subtracting the total estimated load from the processing capacity of the relevant processing device may be determined as an excess capacity score.

In step S102, the excess capacity scores may be calculated using the values in FIGS. 5, 6 and 7. It is assumed that there are four allocation patterns P1, P2, P3 and P4. The allocation pattern P1 may be an allocation pattern in which the analysis units A1, A2 and A3 are allocated to the first processing device and no analysis unit is allocated to the second processing device. The allocation pattern P2 may be an allocation pattern in which analysis units A1 and A2 are allocated to the first processing device and the analysis unit A3 is allocated to the second processing device. The allocation pattern P3 may be an allocation pattern in which the analysis units A1 and A3 are allocated to the first processing device and the analysis unit A2 is allocated to the second processing device. The allocation pattern P4 may be an allocation pattern in which the analysis unit A1 is allocated to the first processing device and the analysis units A2 and A3 are allocated to the second processing device.

Calculation of excess capacity scores for the first processing device in the allocation pattern P1 will be described. Where the time span is 6 seconds, referring to FIG. 6, there may be two analysis units whose allowable delay time is no more than 6 seconds, that is, the analysis units A1 and A2. Referring to FIG. 5, largest estimated load in T seconds/T for the analysis unit A1 may be $$2000 - 100 \times \ln T,$$

and largest estimated load in T seconds/T for the analysis unit A2 may be $$1800 - 100 \times \ln T.$$

Where the time span is 6 seconds, the total estimated load may be $$(2000 - 100 \times \ln(6)) + (1800 - 100 \times \ln(6)) = 3441.65.$$

Referring to FIG. 7, the processor processing capacity of the first processing device may be 4000, and where the time span is 6 seconds, the excess capacity score may be $$4000 - 3441.64 = 55835.$$

Where the time span is 600 seconds, referring to FIG. 6, there may be three analysis units whose allowable delay time is no more than 600 seconds, that is, the analysis units A1, A2 and A3. Referring to FIG. 5, largest estimated load in T seconds/T for the analysis unit A1 may be $$2000 - 100 \times \ln T,$$

largest estimated load in T seconds/T for the analysis unit A2 may be $$1800 - 100 \times \ln T, \text{ and}$$

largest estimated load in T seconds/T for the analysis unit A3 may be $$4000 - 400 \times \ln T.$$

Where the time span is 600 seconds, the total estimated load may be $$(2000 - 100 \times \ln(600)) + (1800 - 100 \times \ln(600)) + (4000 - 400 \times \ln(600)) = 3961.84.$$

Referring to FIG. 7, the processor processing capacity of the first processing device may be 4000, and where the time span is 600 seconds, the excess capacity score may be $$4000 - 3961.84 = 38.16.$$

Since the second processing device in the allocation pattern P1 does not perform analysis, regardless of whether the time span is 6 seconds or 600 seconds, the excess capacity score may be $$4000 - 0 = 4000.$$

As described above, the excess capacity scores related to the possible allocation patterns of the analysis units and to the processing devices may be calculated for each of the plurality of time spans set in step S101. Results of calculation of excess capacity scores for the remaining allocation patterns P2, P3 and P4 may be those indicated in the table illustrated in FIG. 9.

In step S103, the allocation control section 104 may select an optimum allocation pattern on a basis of the excess capacity scores calculated in step S102. As a method for the selection, the allocation control section 104 may extract a smallest value for each allocation pattern from among the excess capacity scores for each of the time spans, the excess capacity scores being related to the allocation patterns and to the processing devices. The allocation control section 104 may calculate a largest value of the smallest values of the excess capacity scores of the respective allocation patterns. The allocation control section 104 may select the allocation pattern having the largest value as an optimum allocation pattern.

As an example, in the case of the excess capacity scores indicated in FIG. 9, a smallest value of excess capacity scores for the allocation pattern P1 may be 38.16. Likewise, a smallest value of excess capacity scores for the allocation pattern P2 may be 558.35, a smallest value of excess capacity scores for the allocation pattern P3 may be 1198.46, and a smallest value of excess capacity scores for the allocation pattern P4 may be 1398.46. The allocation control section 104 may select the allocation pattern P4 having 1398.46, which is the largest value of the smallest values of the excess capacity scores of the respective allocation patterns, as an optimum allocation pattern.

In step S104, the analysis control section 105 may allocate all the analysis units to the first processing device or the second processing device on a basis of the allocation pattern determined by the allocation control section 104 in step S103, designate the delay times indicated in FIG. 6 and processing priorities for the respective analysis units, and provide an instruction to perform an analysis. The processing priorities may be priorities of the analysis units A1, A2 and A3 for scheduling as to which is run for a longer period of time. In some aspects, the analysis control section 105 may consistently control the delay time and the processing priorities of all the analysis units allocated in the first processing device and the second processing device. In other aspects, the control of the delay time and the processing priorities may be performed not by the analysis control section 105 but by control sections in the first processing device and the second processing device. In this case, the analysis control section 105 may provide an instruction about the delay time and the processing priorities to the control sections in the first processing device and the second processing device. Further, the control sections in the first processing device and the second processing device may control the analysis units allocated in the respective devices on a basis of the instructed delay time and processing priorities.

Accordingly, the analysis controller 100 may finish the operation for allocation of the analysis units and performance of the analysis.

An effect of the first exemplary embodiment of the present disclosure will be described.

The above-described analysis controller 100 may efficiently run a plurality of analysis units via a plurality of processing devices by having a configuration such as described below. In other words, first, the allocation control section 104 may set a plurality of time spans on a basis of allowable delay time information, and on a basis of estimated load information for each time span, calculate an excess capacity score for a processing device for the time span from a total of estimated loads of analysis units preferentially run. Second, the allocation control section 104 may select an allocation pattern whose smallest value of the excess capacity scores is largest among those calculated for the respective patterns as an optimum allocation pattern. Consequently, the analysis controller 100 may shift a peak of load by delaying analysis performed by a particular analysis unit for a proper time span and may equalize load for the plurality of processing devices, and thus may provide the effect of being able to efficiently run a plurality of analysis units via a plurality of processing devices.

Second Exemplary Embodiment

A second exemplary embodiment of the present disclosure will be described in detail with reference to the drawings.

Figure 10:
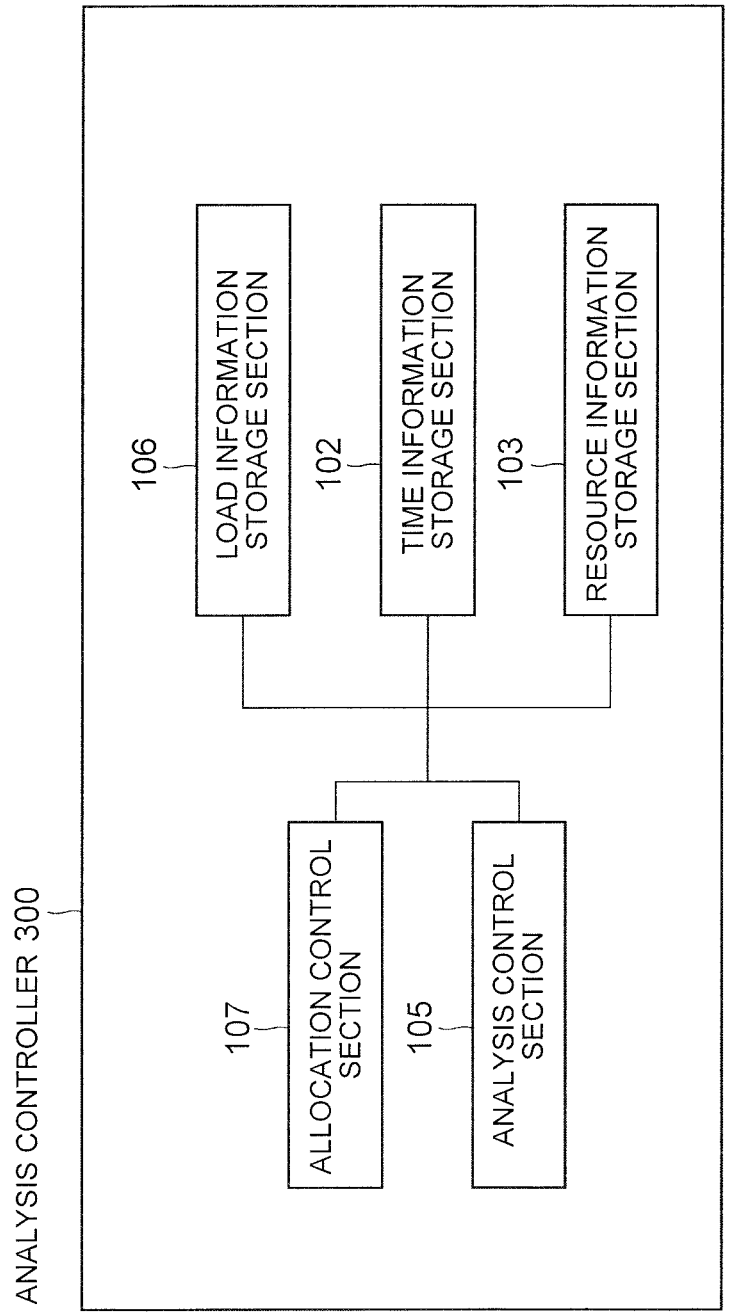
FIG. 10 is a block diagram illustrating a configuration of an analysis controller according to at least one exemplary embodiment.

FIG. 10 is a block diagram illustrating a configuration of an analysis controller 300 according to at least one exemplary embodiment.

Referring to FIG. 10, the analysis controller 300 according to the present exemplary embodiment may include a load information storage section 106 instead of the load information storage section 101, and an allocation control section 107 instead of the allocation control section 104, respectively, compared to that of the first exemplary embodiment.

The second exemplary embodiment may be different from the first exemplary embodiment in that the load information storage section 106 may store largest estimated load in T seconds/T and a variation coefficient for each of analysis units A1, A2 and A3. A variation coefficient may be a value obtained by dividing a standard deviation by an arithmetic mean. Where a largest estimated load in T seconds/T value varies, largest estimated load in T seconds/T may be set as an arithmetic mean and relative variation of largest estimated load in T seconds/T may be represented as a variation coefficient. A value of the variation coefficient may be calculated from load values measured as a result of an analysis being performed or may be calculate from, e.g., theoretical values.

The allocation control section 107 may calculate an excess capacity score for a time span T as described below. The allocation control section 107 may pick out analysis unit(s) whose allowable delay time is no more than a time span T from among analysis unit(s) allocated in a relevant processing device. The allocation control section 107 may calculate an average and a variance of an estimated load for each of the analysis units for the time span T. The allocation control section 107 may total the averages and the variances of the estimated loads for the analysis units to obtain an average and a variance of a total estimated load. The allocation control section 107 may calculate the probability of the loads not exceeding the processing capacity of the processing device on a basis of a processing capacity of the relevant processing device and the average and the variance of the total estimated load, and the allocation control section 107 may determine the probability as an excess capacity score.

Operation of the analysis controller 300 will be described with reference to the flowchart illustrated in FIG. 11.

An example of operation of the analysis controller 300 will be described using FIG. 11.

Figures 11, 12:
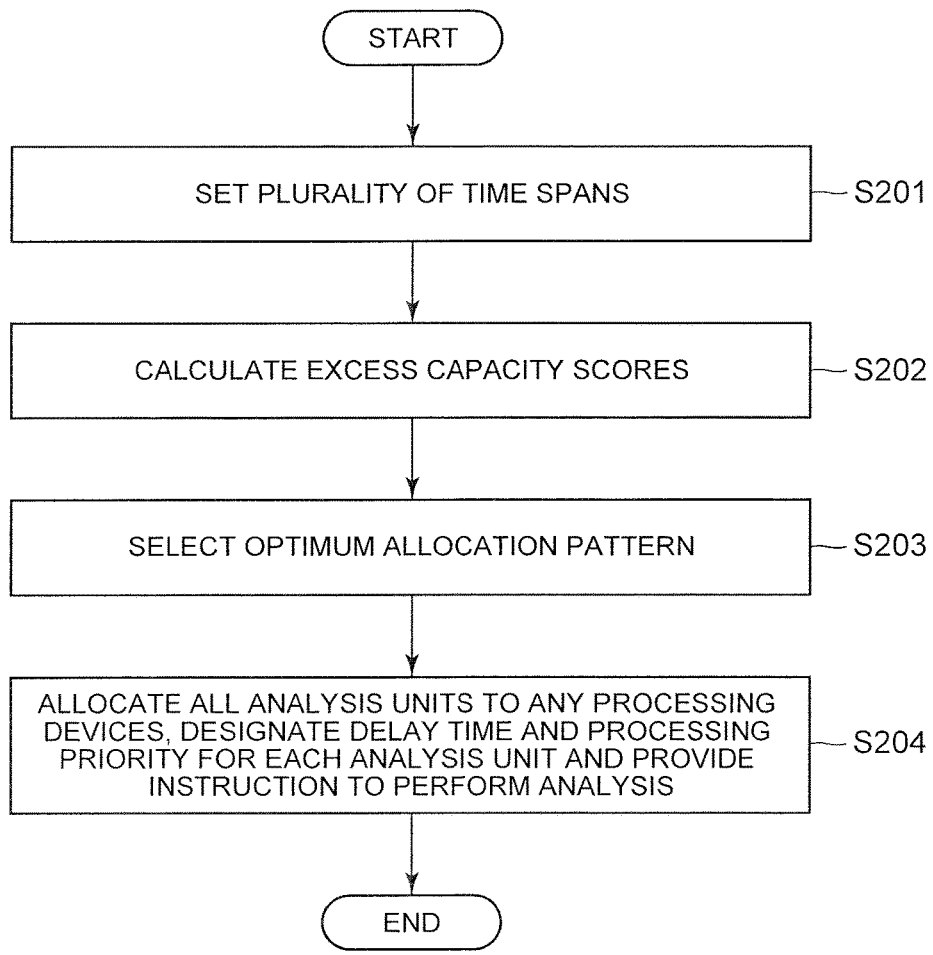
FIG. 11 is a flowchart illustrating an outline of operation for allocation of analysis units and performance of an analysis in the analysis controller according to at least one exemplary embodiment.
FIG. 12 is a table indicating a largest estimated load in T seconds/T value and a variation coefficient for each analysis unit, which is information stored in a load information storage section of the analysis controller according to at least one exemplary embodiment.

FIG. 11 is a flowchart illustrating an outline of operation for allocation of analysis units and performance of an analysis in the analysis controller 300. The processing in the flowchart may be performed on a basis of the above-described programmed control performed by the CPU of the computer apparatus 1000. It is assumed that largest estimated load in T seconds/T values and variation coefficients stored in the load information storage section 106 are those indicated in FIG. 12 and allowable delay time values stored in the time information storage section 102 and processor processing capacity values stored in the resource information storage section 103 are values that are the same as those of the first exemplary embodiment, that is, are those indicated in FIGS. 6 and 7, respectively.

As illustrated in FIG. 11, in step S201, the allocation control section 107 may refer to the time information storage section 102, and set a plurality of time spans.

In step S202, the allocation control section 107 may calculate excess capacity scores in relation to possible allocation patterns of the analysis units and the processing devices, for each of the plurality of time spans set in step S201.

An example of calculation of the excess capacity scores in step S202 using the values in FIGS. 6, 7 and 12 will be described. It is assumed that there are four allocation patterns P1, P2, P3 and P4, which are the same as those of the first exemplary embodiment.

An example of calculation of excess capacity scores for the first processing device in the allocation pattern P1 will be described. Where the time span is 6 seconds, referring to FIG. 6, there may be two analysis units whose allowable delay time is no more than 6 seconds, that is, the analysis units A1 and A2. Referring to FIG. 12, an average of largest estimated load in T seconds/T for the analysis unit A1 may be $2000-100 \times \ln(T)$, and an average of largest estimated load in T seconds/T for the analysis unit A2 may be $1800-100 \times \ln(T)$.

Where the time span is 6 seconds, an average of the total estimated load may be $(2000-100 \times \ln(6)) + (1800-100 \times \ln(6)) = 3441.65$.

Referring to FIG. 12, a variation coefficient of largest estimated load in T seconds/T for the analysis unit A1 may be 0.5, and a variation coefficient of largest estimated load in T seconds/T for the analysis unit A2 may be 0.5. A variance of the total estimated load may be $((2000-100 \times \ln(6)) \times 0.5)^2 + ((1800-100 \times \ln(6)) \times 0.5)^2 = 1485617.71$.

Referring to FIG. 7, a processor processing capacity of the first processing device may be 4000. Assuming that the total estimated load is normally distributed, the allocation control section 107 can calculate the probability of the total estimated load not exceeding 4000 where the average is 3441.65 and the variance is 1485617.71. A value of the probability may be 0.677. Therefore, the excess capacity score may be 0.677.

Since the second processing device in the allocation pattern P1 does not perform analysis, as in the first exemplary embodiment, regardless of whether the time span is 6 seconds or 600 seconds, the excess capacity score may be 4000.

As described above, the allocation control section 107 may calculate the excess capacity scores related to the possible allocation patterns of the analysis units and to the processing devices for each of the plurality of time spans set in step S201. FIG. 13 is a diagram illustrating an example of a table of results of calculation of excess capacity scores for the remaining allocation pattern P2, P3 and P4.

The subsequent processing may be similar to that of the first exemplary embodiment. In some aspects, in step S203, on a basis of the calculated excess capacity scores, the analysis control section 105 may select an optimum allocation pattern. In step S204, the analysis control section 105 may allocate all the analysis units to the first processing device and the second processing device on a basis of the allocation pattern, designate delay time and a processing priority for each of the analysis units, and provide an instruction to perform an analysis. In the case of the excess capacity scores in FIG. 13, the analysis control section 105 may select the allocation pattern P4 having an excess capacity score of 0.951 which is a largest value of smallest values of the excess capacity scores for the respective allocation patterns, as an optimum allocation pattern.

Accordingly, the analysis controller 300 may finish the operation for allocation of the analysis units and performance of the analysis.

An effect of the second exemplary embodiment of the present disclosure will be described.

The above-described analysis controller 300 may enable provision of an effect that is similar to that of the first exemplary embodiment even if an estimated load for each analysis unit varies by having a configuration such as described below. In other words, first, the allocation control section 107 may calculate the respective probabilities of not exceeding the processing capacities of the first processing device and the second processing device on a basis of the averages and the variation coefficients of the estimated loads on the respective analysis units, and use the probabilities as excess capacity scores. Therefore, the analysis controller 300 may provide the effect of being able to provide an effect that is similar to that of the first exemplary embodiment even if an estimated load for each analysis unit varies.

Third Exemplary Embodiment

A third exemplary embodiment of the present disclosure will be described in detail with reference to the drawings.

Figure 14:
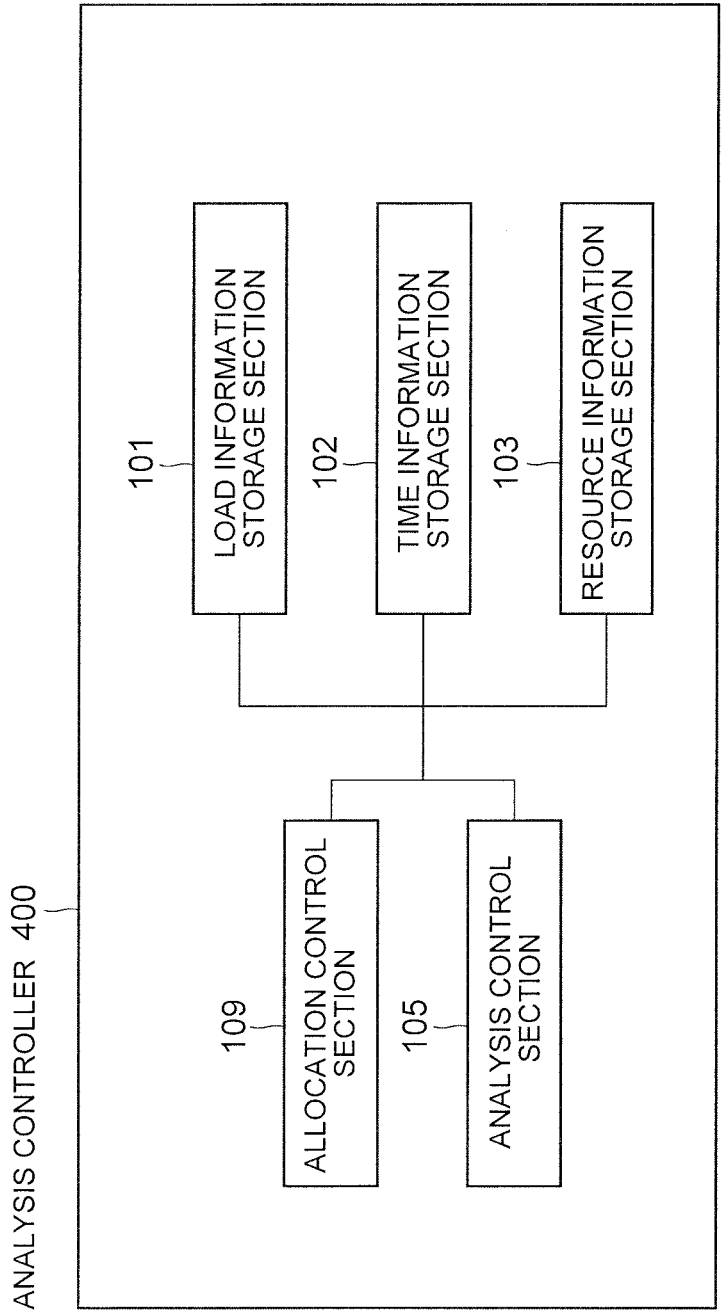
FIG. 14 is a block diagram illustrating a configuration of an analysis controller according to at least one exemplary embodiment.

FIG. 14 is a block diagram illustrating a configuration of an analysis controller 400 according to the third exemplary embodiment of the present disclosure.

Referring to FIG. 14, analysis controller 400 according to the present exemplary embodiment includes an allocation control section 109 instead of the allocation control section 104, compared to that of the first exemplary embodiment.

The third exemplary embodiment may be different from the first exemplary embodiment in that the allocation control section 109 selects an optimum allocation pattern on a basis of an average of excess capacity scores for respective time spans and determination of whether or not the excess capacity scores include a negative number.

The allocation control section 109 may calculate an optimum allocation pattern as described below. The allocation control section 109 may calculate averages of excess capacity scores related to allocation patterns and to processing devices for each time span. The allocation control section 109 may determine whether or not the excess capacity scores include a negative number for each allocation pattern. The allocation control section 109 may calculate a largest value of the averages of the excess capacity scores for the respective time spans, the excess capacity scores including no negative number. The allocation control section 109 may select the allocation pattern having the largest value as an optimum allocation pattern.

Operation of the analysis controller 400 will be described with reference to the flowchart illustrated in FIG. 15.

An example of operation of the analysis controller 400 for carrying out the present disclosure will be described using FIG. 15.

Figures 15, 16:
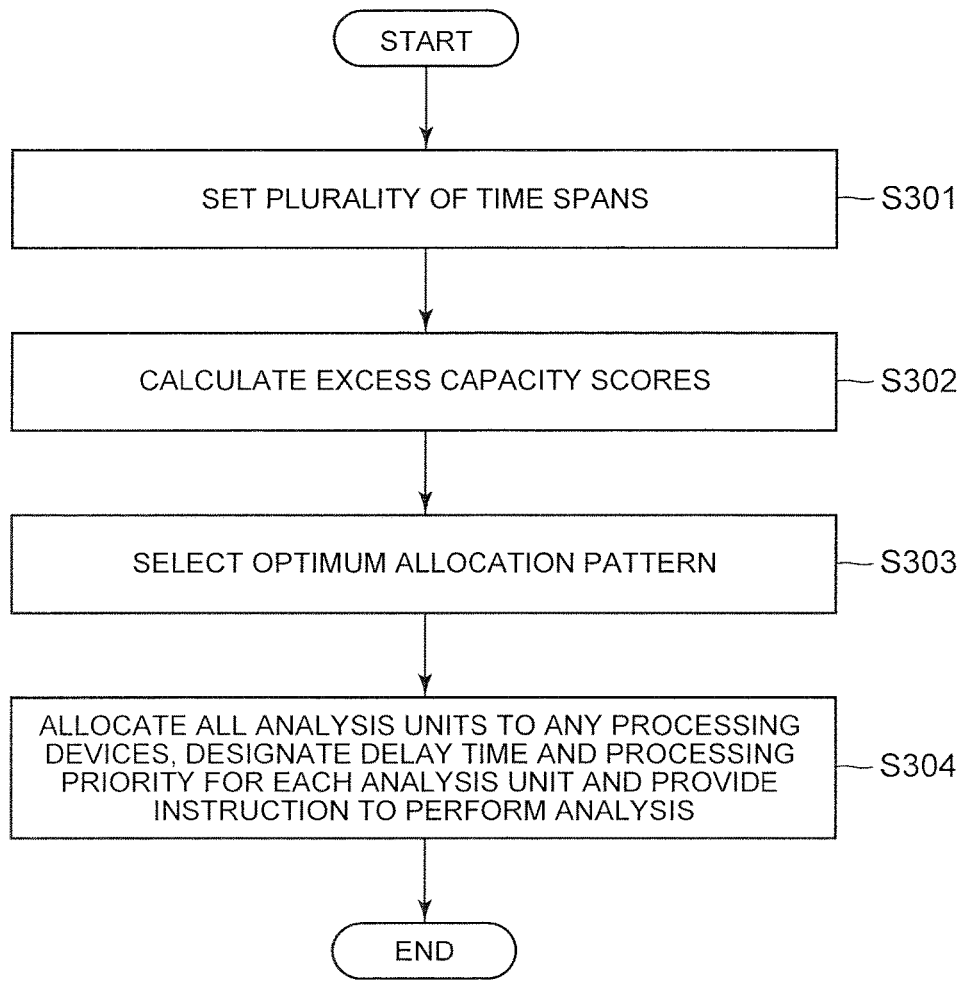
FIG. 15 is a flowchart illustrating an outline of operation for allocation of analysis units and performance of an analysis in the analysis controller according to at least one exemplary embodiment.
FIG. 16 is a table indicating a value of a processor processing capacity of each processing device, which is information stored in a resource information storage section of the analysis controller according to at least one exemplary embodiment.

FIG. 15 is a flowchart illustrating an outline of operation for allocation of analysis units and performance of an analysis in the analysis controller 400. The processing in the flowchart may be performed on a basis of the above-described programmed control by the CPU. It is assumed that values of processor processing capacities stored in a resource information storage section 103 in the present exemplary embodiment are those indicated in FIG. 16, largest estimated load in T seconds/T values stored in a load information storage section 101, and allowable delay time values stored in a time information storage section 102 are values that are similar to those of the first exemplary embodiment, that is, those indicated in FIGS. 5 and 6, respectively.

As illustrated in FIG. 17, in Step S301, the allocation control section 109 may refer to the time information storage section 102 and set a plurality of time spans.

In step S302, the allocation control section 109 may calculate an excess capacity score for each of possible allocation patterns of analysis units, each of processing devices and each of the plurality of time spans set in step S301.

In step S303, the allocation control section 109 may select an optimum allocation pattern on a basis of the excess capacity scores calculated in step S302.

An example that the allocation control section 109 selects the optimum allocation pattern in step S303 on a basis of excess capacity scores calculated using the values in FIGS. 5, 6 and 16 will be described. It is assumed that allocation patterns and a calculation method are the same as those of the first exemplary embodiment, and calculated excess capacity scores are those indicated in FIG. 17.

As an example, in the case of the excess capacity scores in FIG. 17, an excess capacity score for a first processing device in an allocation pattern P1 where the time span is 6 seconds is −441.65, and the excess capacity score where the time span is 600 seconds may be −961.84, and an average of the excess capacity scores for the respective time spans may be $$((-441.65)+(-961.84))/2=-701.75.$$

Likewise, averages of excess capacity scores related to all of the allocation patterns and the processing devices may be calculated for the respective time spans. An excess capacity score for a second processing device where the time span is 6 seconds may be 3000, and the excess capacity score where the time span is 600 seconds may be 3000. Therefore, for the allocation pattern P1, the allocation control section 109 may determine that the excess capacity score includes a negative number. Likewise, the allocation control section 109 may determine whether or not the excess capacity scores include a negative number, for each of all the allocation patterns. In the allocation patterns P1, P2, P3 and P4, allocation patterns whose excess capacity scores include no negative number may be P3 and P4, and from among P3 and P4, a largest value of the averages of the excess capacity scores for the respective time spans may be 1609.43. The allocation control section 109 may select the allocation pattern P3 having the largest value.

In step S304, the analysis control section 105 may allocate all the analysis units to the first processing device and the second processing device on a basis of the selected allocation pattern. The analysis control section 105 may designate delay time and a processing priority for each of the analysis units, and provide an instruction to perform an analysis. This processing is similar to that of the first exemplary embodiment.

Accordingly, the analysis controller 400 may finish the operation for allocation of the analysis units and performance of the analysis.

The above-described analysis controller 400 can maximize an excess capacity of one processing device as long as none of a plurality of processing devices is overloaded by having a configuration such as described below. In other words, first, the allocation control section 109 may calculate averages of excess capacity scores related to the allocation patterns to the processing devices for the respective time spans, and determine whether or not the excess capacity scores include a negative number, for each allocation pattern. Second, the allocation control section 109 may extract allocation patterns whose excess capacity scores include no negative number, and select an allocation pattern whose average of the excess capacity scores for the respective time spans is the largest. Third, an excess capacity score having a negative number may mean the total estimated load exceeding the processor processing capacity, that is, an overloaded state. Therefore, overloaded allocation patterns can be excluded, and thus, the analysis controller 300 may enable provision of the effect of being able to maximize an excess capacity of one processing device as long as none of a plurality of processing devices is overloaded.

Fourth Exemplary Embodiment

A fourth exemplary embodiment of the present disclosure will be described in detail with reference to the drawings.

Figures 18, 19:
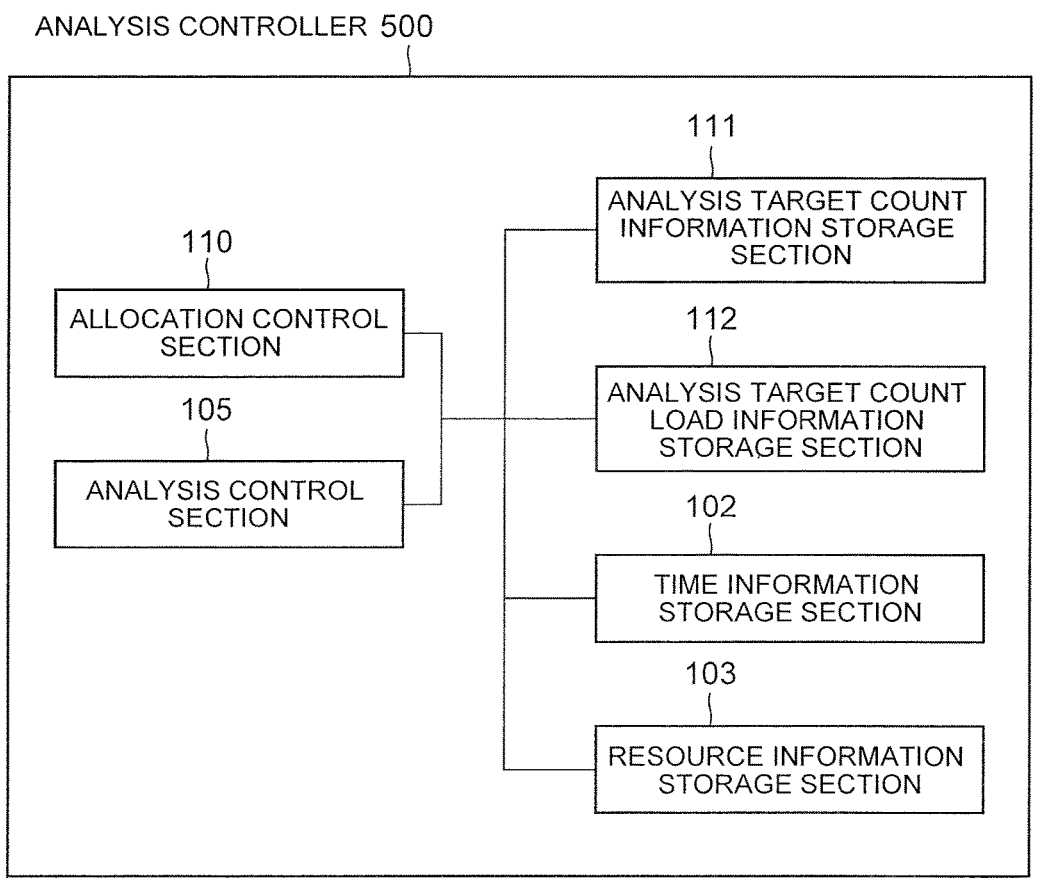
FIG. 18 is a block diagram illustrating a configuration of an analysis controller according to at least one exemplary embodiment.
FIG. 19 is a table indicating a largest estimated analysis target count in T seconds/T value for each analysis unit, which is information stored in an analysis target count information storage section of the analysis controller according to at least one exemplary embodiment.

FIG. 18 is a block diagram illustrating a configuration of an analysis controller 500.

Referring to FIG. 18, the analysis controller 500 may include an allocation control section 110 instead of the allocation control section 104, an analysis target count information storage section 111 and an analysis target count load information storage section 112 instead of the load information storage section 101, respectively, compared to that of the first exemplary embodiment.

The fourth exemplary embodiment may be different from the first exemplary embodiment in that the allocation control section 110 calculates estimated loads for each time span on a basis of a value obtained by dividing a largest estimated analysis target count in T seconds by T (referred to as "largest estimated analysis target count in T seconds/T", hereinafter) stored in the analysis target count information storage section 111 and estimated loads per second where there are N (N is a non-negative integer) analysis targets, which are stored in the analysis target count load information storage section 112, and then calculates an excess capacity score for each allocation pattern, each processing device and each of the plurality of time spans.

The analysis target count information storage section 111 may store estimated analysis target counts for the respective time spans, which are included in data distributed by a data distribution apparatus to respective analysis units.

An example of an estimated analysis target count for each time span will be described in detail. For example, assuming that a data distribution apparatus distributes data to a processing device, zero to a plurality of analysis targets can be included in the data frames. For example, if the processing device does not buffer the data frames, a largest estimated analysis target count may be an analysis target count at the time of a peak. If the processing device buffers the data frames to perform an analysis while the data frames being delayed for a maximum of 6 seconds, the processing device may perform the analysis with a data frame including the analysis target count at the time of a peak dispersed to off-peak time other than the peak time, and thus, a value obtained by dividing a largest estimated analysis target count in 6 seconds by 6 may be smaller than the analysis target count at the time of a peak. Where the processing device buffers the data frames to perform an analysis while the data frames being delayed for a maximum time span of 600 seconds, off-peak time other than the peak time may increase, and a value obtained by dividing a largest estimated analysis target count in 600 seconds by 600 may be smaller than that of the case where the time span is 6 seconds. In other words, where the time span is T seconds, largest estimated analysis target count in T seconds/T may decrease as T increases. In the example in FIG. 19, the analysis controller 500 may generate the model of largest estimated analysis target count in T seconds/T logarithmically decreasing as T increases, and store a function of the model.

The values of the largest estimated analysis target count in T seconds/T may not be limited to the examples indicated in FIG. 19, and the analysis controller 500 may store the values of the largest estimated analysis target count in T seconds/T using other functions and/or another tabular format. In some aspects, coefficients of such functions and/or values in the tabular format may be calculated from measured analysis target count values or may be calculated from, e.g., theoretical values.

The analysis target count load information storage section 112 may store an estimated load according to an analysis target count included in data, for run of analysis units A1, A2 and A3.

An example of an estimated load according to an analysis target count will be described in detail. For example, it is assumed that the analysis units A1, A2 and A3 perform processing for detecting a plurality of analysis targets included in video data to extract features of the analysis targets. In such case, a load may be a sum of a load required for detection of the analysis targets and a load required for extraction of a feature for each analysis target. In other words, where an analysis target count included in data is N, the load of the analysis may increase according to N. In the example in FIG. 20, the analysis controller 500 may generate the model of an estimated load per second where there are N analysis targets linearly increasing as N increases, and store a function of the model.

Figures 20, 21:
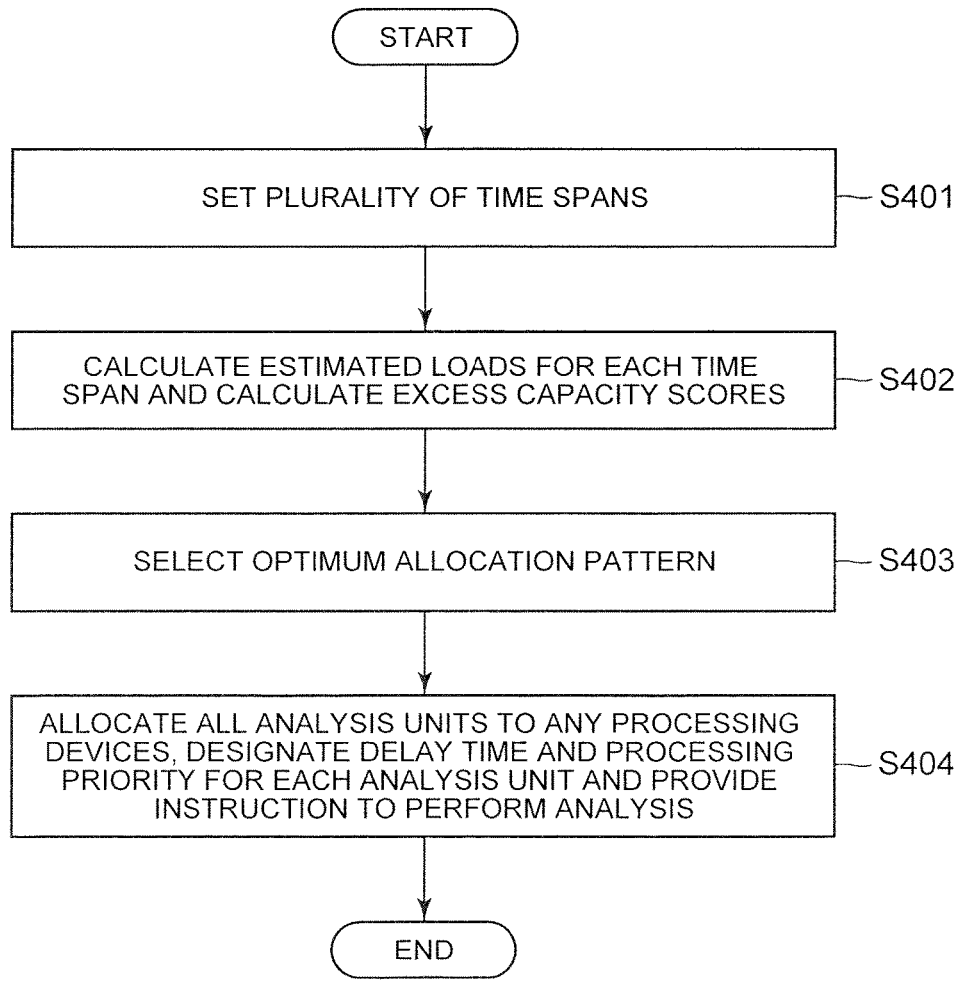
FIG. 20 is a table indicating an estimated load per second value where there are N analysis targets for each analysis unit, which is information stored in an analysis target count load information storage section of the analysis controller according to at least one exemplary embodiment.
FIG. 21 is a flowchart illustrating an outline of operation for allocation of analysis units and performance of an analysis in the analysis controller according to at least one exemplary embodiment.

The values of estimated loads per second where there are N analysis targets may not be limited to the examples indicated in FIG. 20, and the analysis controller 500 may store the values of estimated loads per second where there are N analysis targets using other functions and/or another tabular format. In some aspects, coefficients of such functions and/or values in the tabular format may be calculated from values of loads measured as a result of an analysis being performed, or from, e.g. theoretical values.

The allocation control section 110 may calculate an excess capacity score as described below. The allocation control section 110 may pick out analysis unit(s) whose allowable delay time is no more than the time span T, from among analysis units allocated to a relevant processing device. The allocation control section 110 may refer to the analysis target count information storage section 111 and calculate an estimated analysis target count in the time span T for each of the analysis unit(s). The allocation control section 110 may refer to the analysis target count load information storage section 112 and calculate an estimated load according to the analysis target count for each of the analysis unit(s). The allocation control section 110 may calculate a total estimated load by totaling the estimated load(s). The allocation control section 110 may determine a value obtained by subtracting the total estimated load from a processing capacity of the relevant processing device as an excess capacity score.

Operation of the analysis controller 500 will be described with reference to the flowchart illustrated in FIG. 21.

An example of operation of the analysis controller 500 for carrying out the present disclosure will be described using FIG. 21.

FIG. 21 is a flowchart illustrating an outline of operation for allocation of analysis units and performance of an analysis in the analysis controller 500. The processing in the flowchart may be performed on a basis of the aforementioned programmed control by the CPU. It is assumed that largest estimated analysis target count in T seconds/T values stored in the analysis target count information storage section 111 in the present exemplary embodiment are those indicated in FIG. 19, and estimated load per second values where there are N analysis targets, which are stored in the analysis target count load information storage section 112, are those indicated in FIG. 20. It is assumed that allowable delay time values stored in the time information storage section 102 and processor processing capacity values stored in the resource information storage section 103 are values that are the same as those of the first exemplary embodiment, that is, those indicated in FIGS. 6 and 7, respectively.

As illustrated in FIG. 21, in step S401, the allocation control section 110 may refer to a time information storage section 102 and set a plurality of time spans.

In step S402, the allocation control section 110 may calculate estimated loads for each time span on a basis of largest estimated analysis target count in T seconds/T stored in the analysis target count information storage section 111 and estimated loads per second where there are N analysis targets, which are stored in the analysis target count load information storage section 112. Further, the allocation control section 110 may calculate excess capacity scores related to possible allocation patterns of the analysis units and to processing devices, for each of the plurality of time spans set in step S401.

An example of calculation of the excess capacity scores in step S402 using the values in FIGS. 6, 7, 19 and 20 will be described. It is assumed that there are four allocation patterns P1, P2, P3 and P4, which are the same as those of the first exemplary embodiment.

An example of calculation of excess capacity scores for the first processing device in the allocation pattern P1 will be described. Where the time span is 6 seconds, referring to FIG. 6, there may be two analysis units whose allowable delay time is no more than 6 seconds, that is, the analysis units A1 and A2. Referring to FIG. 19, largest estimated analysis target count in T seconds/T in data received by the analysis unit A1 from a data distribution apparatus may be $5 - 0.5 \times \ln T,$ largest estimated analysis target count in T seconds/T in data received by the analysis unit A2 from the data distribution apparatus may be $2 - 0.25 \times \ln T.$ Where the time span is 6 seconds, an estimated analysis target count in the data received by the analysis unit A1 from the data distribution apparatus may be $5 - 0.5 \times \ln(6) = 4.10,$ an estimated analysis target count in data received by the analysis unit A2 from the data distribution apparatus may be $2 - 0.25 \times \ln(6) = 1.55.$ An estimated load per second on the analysis unit A1 where there are N analysis targets may be $1000 + 200 \times N,$ and an estimated load per second for the analysis unit A2 where there are N analysis targets may be

1000+400×N.

Where the time span is 6 seconds, an estimated load for the analysis unit A1 may be 1000+200×4.10=1820.82, and an estimated load for the analysis unit A2 may be

1000+400×1.55=1620.82.

Therefore, a total estimated load may be 1820.82+1620.82=3441.65.

Referring to FIG. 7, a processor processing capacity of the first processing device may be 4000, and where the time span is 6 seconds, the excess capacity score may be

4000−3441.64=55835.

Likewise, an excess capacity score may be calculated for each of all allocation patterns, each processing device and each time span.

In step S403, on a basis of the calculated excess capacity scores, an analysis control section 105 may select an optimum allocation pattern. In step S404, the analysis control section 105 may allocate all the analysis units to the first processing device and the second processing device on a basis of the selected allocation pattern. Further, the analysis control section 105 may designate delay time and a processing priority for each of the analysis units, and provide an instruction to perform an analysis. This processing may be similar to that of the first exemplary embodiment.

Accordingly, the analysis controller 500 may finish the operation for allocation of the analysis units and execution of the analysis.

The above-described analysis controller 500 may enable provision of an effect that is similar to that of the first exemplary embodiment even if estimated loads for the analysis units A1, A2 and A3 for respective time spans are not directly stored by having a configuration such as described below. In other words, first, the analysis controller 500 may include the analysis target count information storage section 111 that stores largest estimated analysis target count in T seconds/T, and the analysis target count load information storage section 112 that stores estimated loads per second where there are N analysis targets. Therefore, estimated loads for the analysis units A1, A2 and A3 for the respective time spans may be indirectly calculated, and thus, the analysis controller 500 may provide the effect of being able to provide an effect that is similar to that of the first exemplary embodiment even if estimated loads for the analysis units A1, A2 and A3 for the respective time spans are not directly stored.

Fifth Exemplary Embodiment

A fifth exemplary embodiment of the present disclosure will be described in detail with reference to the drawings.

Figure 22:
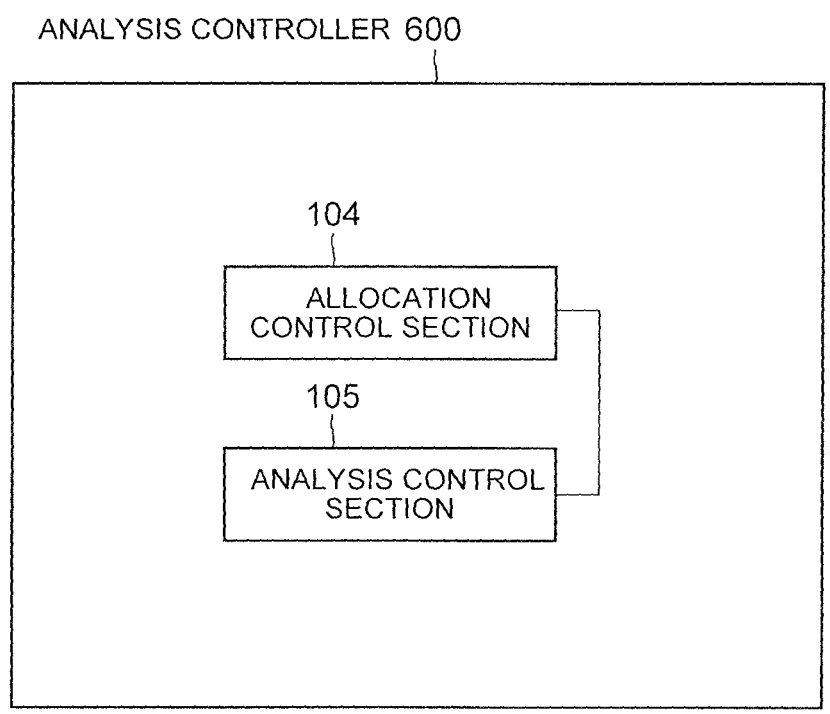
FIG. 22 is a block diagram illustrating a configuration of an analysis controller according to at least one exemplary embodiment.

FIG. 22 is a block diagram illustrating a configuration of an analysis controller 600.

Referring to FIG. 22, the analysis controller 600 may include the allocation control section 104 and the analysis control section 105. An external or internal storage device may store estimated loads for one or more analysis units for each time span, which are stored in the load information storage section 101 in the first exemplary embodiment, allowable delay time allowed by a user for each analysis unit, which is stored in the time information storage section 102 in the first exemplary embodiment, and a processing capacity of each of a plurality of processing devices, which is stored in the resource information storage section 103. The external or internal storage device may be a single storage device that stores all such information, or may include a plurality of storage devices that each store one or more kinds of such information.

The analysis controller 600 may operate in a manner that is similar to that of the first exemplary embodiment and provide an effect that is similar to that of the first exemplary embodiment.

Although the present disclosure has been described above with reference to each exemplary embodiment, the present disclosure is not limited to the above-described exemplary embodiments. Various alternations that can be understood by a person skilled in the art can be made to the configurations and the details of the present disclosure as long as such alternations fall within the scope of the present disclosure.

What is claimed is:

1. An analysis controller comprising:
a memory storing instructions; and
at least one processor configured to receive the instructions and the at least one processor configured by the instructions to:
calculate, for each time span, an estimated load for least one analysis unit whose allowable delay time is equal to or shorter than a respective time span;
calculate respective excess capacities of a plurality of processing devices on a basis of the estimated loads for the at least one respective analysis unit,
determine an allocation pattern representing an allocation of the at least one analysis unit, among a plurality of analysis units, to one or more processing devices, among flail the plurality of processing devices, on a basis of the estimated load for each of the at least one analysis unit for each of one or more time spans, allowable delay time for each of the at least one analysis unit, and a processing capacity of each of the plurality of processing devices,
allocate the at least one analysis unit to the plurality of processing devices on a basis of the allocation pattern,
designate delay time and a processing priority for each of the analysis units, and
provide an instruction to the plurality of processing devices to perform an analysis.

2. The analysis controller according to claim 1, wherein the at least one processor is further configured to:
calculate a value of a total estimated load for each the plurality of processing devices by totaling the respective estimated loads of each of the at least one analysis unit for each time span corresponding to the respective processing device, and
determine a value obtained by subtracting the value of the total estimated load from a value of the processing capacity of the respective one of the plurality of processing devices as an excess capacity of the respective one of the plurality of processing devices for each time span.

3. The analysis controller according to claim 1, wherein the at least one processor is further configured to: calculate, for each of a plurality of allocation patterns, a smallest value of the excess capacities of the plurality of respective processing devices for each time span, and determine the allocation pattern, among the plurality of allocation patterns, that maximizes the smallest value of the excess capacities of the plurality of respective processing devices.

4. The analysis controller according to claim 1, wherein the at least one processor is further configured to:
calculate, an average and a variance of a total estimated load for each the plurality of processing devices by totaling the estimated loads of the at least one respective analysis unit corresponding to the respective processing device,
calculate a probability value of the estimated loads not exceeding a value of the processing capacity of a relevant one of the plurality of processing devices, from the average and the variance of the total estimated load, and
determine the probability value as an excess capacity of the relevant one of the plurality of processing devices for each time span.

5. The analysis controller according to claim 1, wherein the at least one processor is further configured to:
calculate an average of excess capacities for the respective time spans of each of the plurality of processing devices for a plurality of allocation patterns,
determine, for each allocation pattern, whether or not the excess capacity for each time span of each of the plurality of processing devices includes a negative number, and
determine the allocation pattern having no negative number for the excess capacity for each of the time spans of each of the plurality of processing devices, and having a largest value of the averages of the excess capacities.

6. The analysis controller according to claim 1, wherein the at least one processor is further configured to:
calculate an estimated analysis target count for each time span; and
calculate the estimated load for each time span based on the estimated analysis target count.

7. An analysis control method performed by at least one processor, the method comprising:
calculating, for each time span, an estimated load for each of at least one analysis unit whose allowable delay time is equal to or shorter than a respective time span;
calculating respective excess capacities of a plurality of processing devices on a basis of the estimated loads for the at least one respective analysis unit;
determining, by at least one processor, an allocation pattern representing an allocation of the at least one analysis unit, among a plurality of analysis units, to one or more processing devices, among the plurality of processing devices, on a basis of the estimated load for each of the at least one analysis unit for each of one or more time spans, allowable delay time for each of the at least one analysis unit, and a processing capacity of each of the plurality of processing devices;
allocating the at least one analysis unit to the plurality of processing devices on a basis of the allocation pattern;
designating delay time and a processing priority for each of the analysis units; and
providing an instruction to the plurality of processing devices to perform an analysis.

8. The analysis control method according to claim 7, further comprising:
calculating a value of a total estimated load for each of the plurality of processing devices by totaling the estimated loads for the respective at least one analysis unit for each time span corresponding to the respective processing device; and
determining a value obtained by subtracting the value of the total estimated load from a value of the processing capacity of the respective one of the plurality of processing devices as an excess capacity of the respective one of the plurality of processing devices for each time span.

9. The analysis control method according to claim 7, further comprising:
calculating, for each of a plurality of allocation patterns, a smallest value of the excess capacities of the plurality of respective processing devices for each time span; and
determining the allocation pattern, among the plurality of allocation patterns, that maximizes the smallest value of the excess capacities of the plurality of respective processing devices.

10. The analysis control method according to claim 7, further comprising:
calculating an average and a variance of a total estimated load for each of the plurality of processing devices by totaling the estimated loads of the at least one respective analysis unit;
calculating a probability value of the estimated loads not exceeding a value of the processing capacity of a respective one of the plurality of processing devices, from the average and the variance of the total estimated load; and
determining the probability value as an excess capacity of the respective on of the plurality of processing devices for each time span.

11. The analysis control method according to claim 7, further comprising:
calculating an average of excess capacities for the respective time spans of each of the plurality of processing devices for a plurality of allocation patterns;
determining, for each allocation pattern, whether or not the excess capacity for each time span of each of the plurality of processing devices includes a negative number; and
determining the allocation pattern having no negative number for the excess capacity for each time span of each of the plurality of processing devices, and having a largest value of the averages of the excess capacities.

12. The analysis control method according to claim 7, further comprising:
calculating an estimated analysis target count for each time span; and
calculating the estimated load for each time span based on the estimated analysis target count.

13. A non-transitory computer-readable storage medium may store instructions that when executed by a computer enable the computer to implement a method comprising:
calculating, for each time span, an estimated load for each of at least one analysis unit whose allowable delay time is equal to or shorter than a respective time spam;
calculating respective excess capacities of a plurality of processing devices on a basis of the estimated loads for the at least one respective analysis unit;
determining, by at least one processor, an allocation pattern representing an allocation of the at least one analysis unit, among a plurality of analysis units, to one or more processing devices, among the plurality of processing devices, on a basis of the estimated load for each of the at least one analysis unit for each of one or more time spans, allowable delay time for each of the at least one analysis unit, and a processing capacity of each of the plurality of processing devices;

allocating the at least one analysis unit to the plurality of processing devices on a basis of the allocation pattern;

designating delay time and a processing priority for each of the analysis units; and providing an instruction to the plurality of processing devices to perform an analysis.

14. The non-transitory computer-readable storage medium according to claim 13, wherein the method further comprises:

calculating a value of a total estimated load for each of the plurality of processing devices by totaling the estimated loads for the respective at least one analysis unit for each time span corresponding to the respective processing device; and determining a value obtained by subtracting the value of the total estimated load from a value of the processing capacity of the respective one of the plurality of processing devices as an excess capacity of the respective one of the plurality of processing devices for each time span.

15. The non-transitory computer-readable storage medium according to claim 13, wherein the method further comprises:

calculating, for each of a plurality of allocation patterns, a smallest value of the excess capacities of the plurality of respective processing devices for each time span; and determining the allocation pattern, among the plurality of allocation patterns, that maximizes the smallest value of the excess capacities of the plurality of respective processing devices.

16. The non-transitory computer-readable storage medium according to claim 13, wherein the method further comprises:

calculating an average and a variance of a total estimated load for each of the plurality of processing devices by totaling the estimated loads of the at least one respective analysis unit;

calculating a probability value of the estimated loads not exceeding a value of the processing capacity of a respective one of the plurality of processing devices, from the average and the variance of the total estimated load; and determining the probability value as an excess capacity of the respective on of the plurality of processing devices for each time span.

17. The non-transitory computer-readable storage medium according to claim 13, wherein the method further comprises:

calculating an average of excess capacities for the respective time spans of each of the plurality of processing devices for a plurality of allocation patterns;

determining, for each allocation pattern, whether or not the excess capacity for each time span of each of the plurality of processing devices includes a negative number; and determining the allocation pattern having no negative number for the excess capacity for each time span of each of the plurality of processing devices, and having a largest value of the averages of the excess capacities.

* * * * *

UNITED STATES PATENT AND TRADEMARK OFFICE
CERTIFICATE OF CORRECTION

PATENT NO. : 9,983,911 B2
APPLICATION NO. : 14/829074
DATED : May 29, 2018
INVENTOR(S) : Yosuke Iwamatsu It is certified that error appears in the above-identified patent and that said Letters Patent is hereby corrected as shown below:

In the Specification

Column 8, Detailed Description, Line 23; "4000-3441.64=55835." has been replaced with --4000-3441.64=558.35.-- therefor Column 17, Detailed Description, Line 17; "4000-3441.64=55835." has been replaced with --4000-3441.64=558.35.-- therefor In the Claims Column 18, Claim 1, Line 28; before "least", insert --each of at --

Column 18, Claim 1, Line 38; after "among", delete "flail"

Signed and Sealed this
Twenty-ninth Day of January, 2019

Andrei Iancu
*Director of the United States Patent and Trademark Office*